Figure 1:
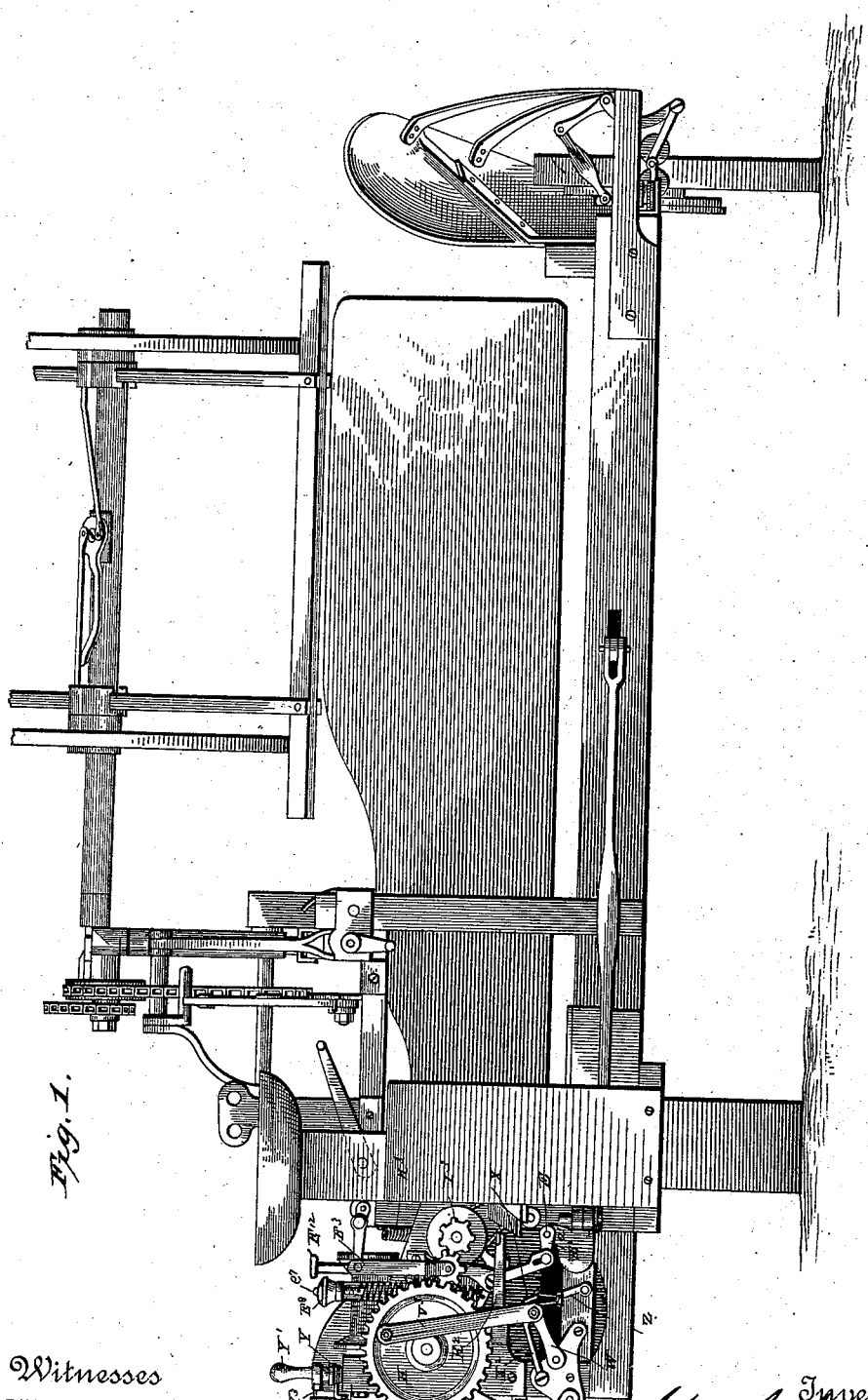

(No Model.) 11 Sheets—Sheet 3.

M. L. NICHOLS.
GRAIN BINDER.

No. 381,079. Patented Apr. 10, 1888.

Witnesses.
Edwin L. Yewell,
Wm. F. Huntemann.

Inventor.
M. L. Nichols,
By his Attorney
Alex Mahon.

(No Model.) 11 Sheets—Sheet 4.
M. L. NICHOLS.
GRAIN BINDER.
No. 381,079. Patented Apr. 10, 1888.
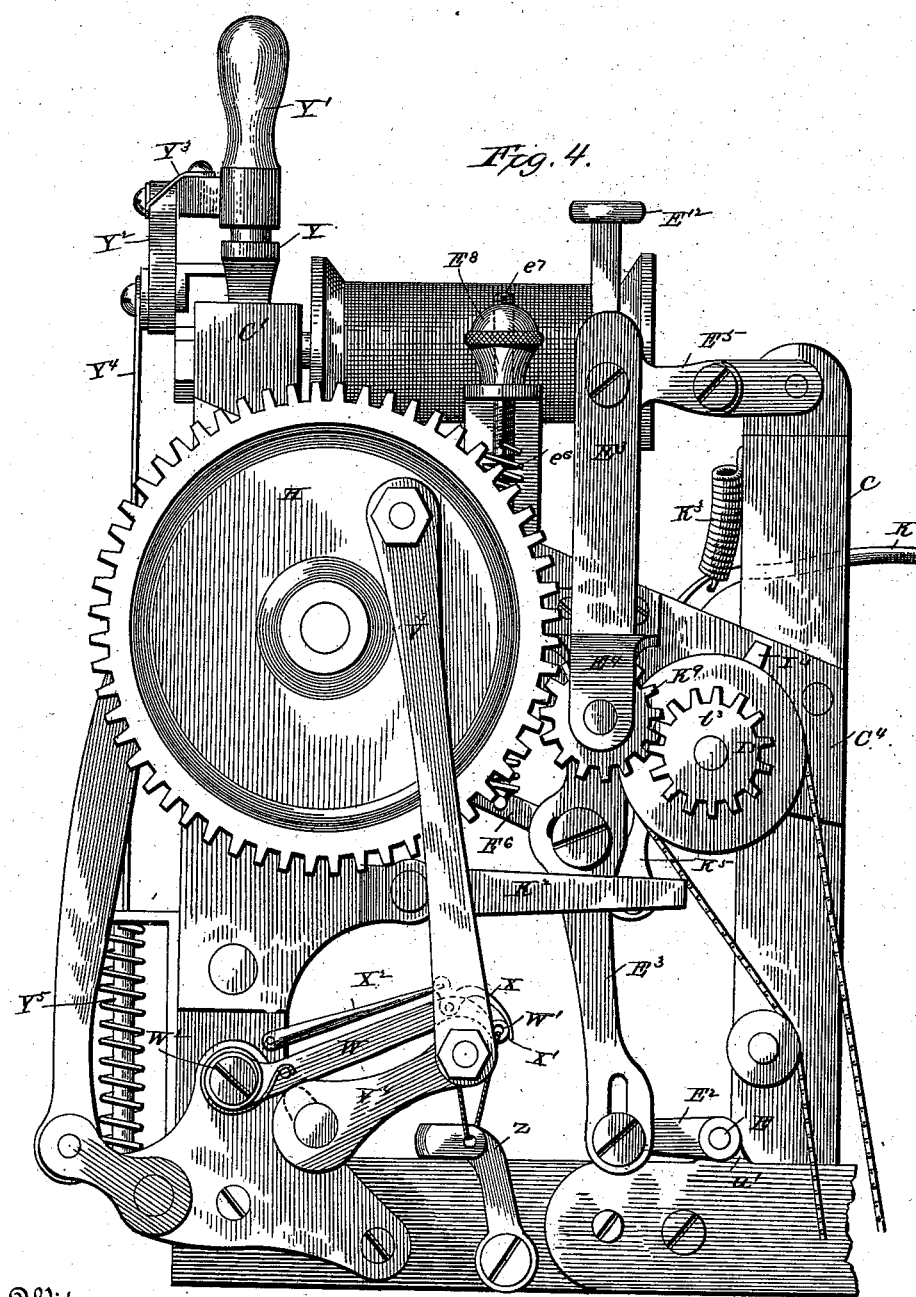

(No Model.)  M. L. NICHOLS.  11 Sheets—Sheet 5.
GRAIN BINDER.
No. 381,079.  Patented Apr. 10, 1888.
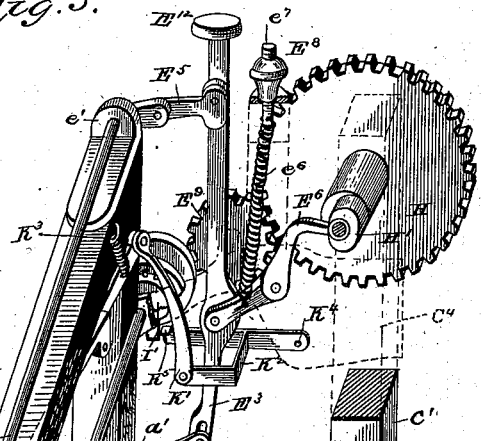
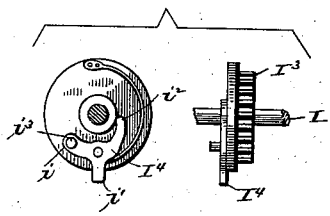
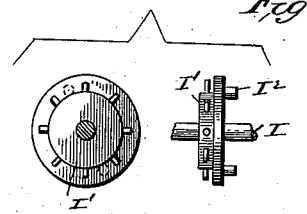
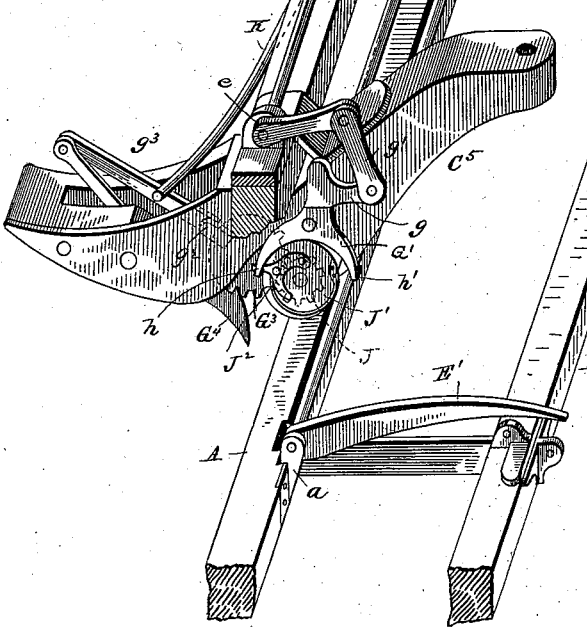
Witnesses.
Edwin L. Yewell,
Wm. F. Huntemann.
Inventor.
M. L. Nichols.
By his Attorney.
Alex Mahon.

(No Model.)  M. L. NICHOLS.  11 Sheets—Sheet 6.
GRAIN BINDER.
No. 381,079. Patented Apr. 10, 1888.
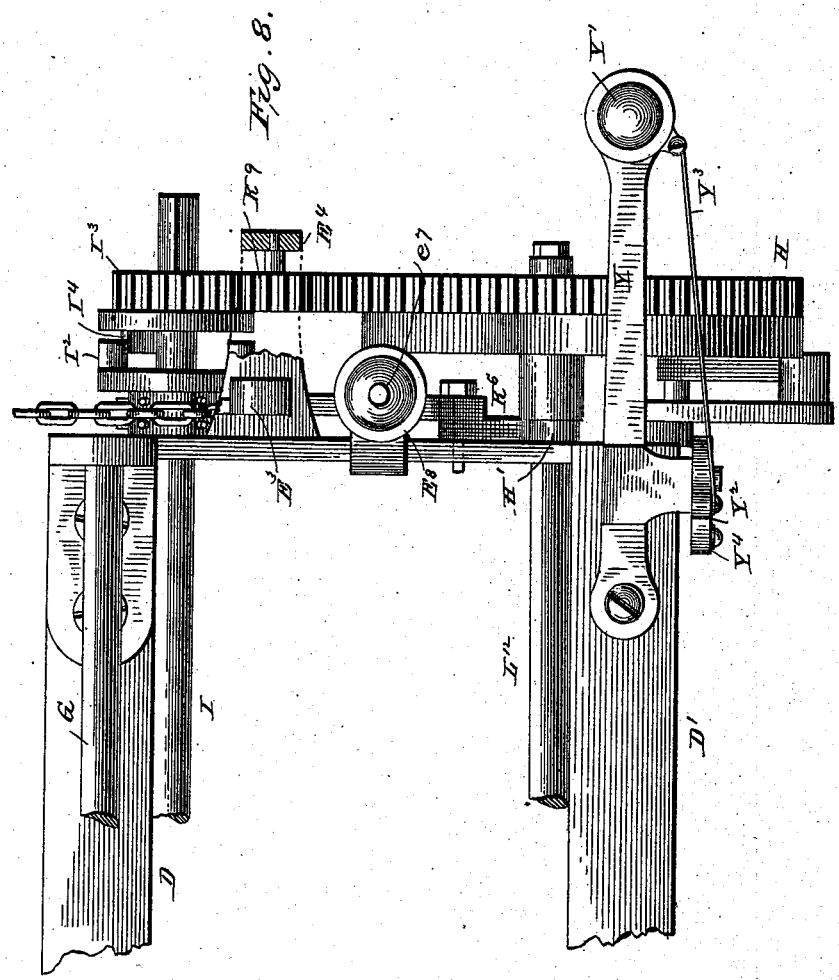
Witnesses.
Edwin T. Yewell,
Wm. T. Huntemann.
Inventor.
M. L. Nichols
By his Attorney
Alex Mahon (No Model.) 11 Sheets—Sheet 7.
M. L. NICHOLS.
GRAIN BINDER.

No. 381,079. Patented Apr. 10, 1888.

Witnesses.
Edwin L. Yewell,
Wm. F. Huntemann

Inventor.
M. L. Nichols.
By his Attorney.
Alex Mahon.

(No Model.) 11 Sheets—Sheet 8.
M. L. NICHOLS.
GRAIN BINDER.
No. 381,079. Patented Apr. 10, 1888.
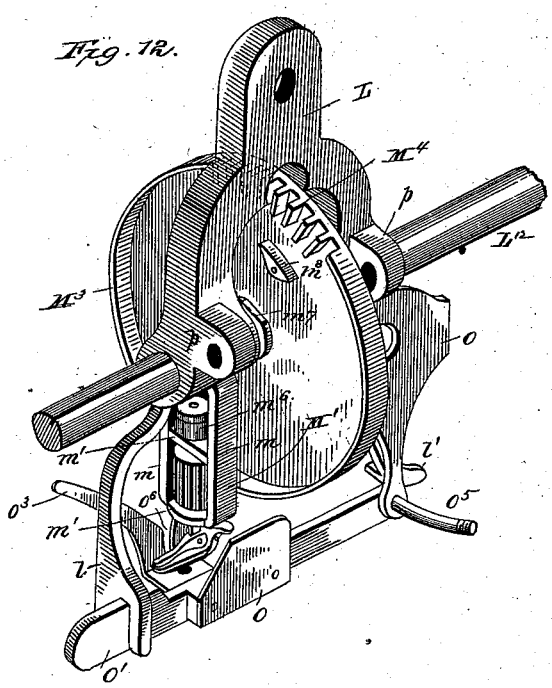
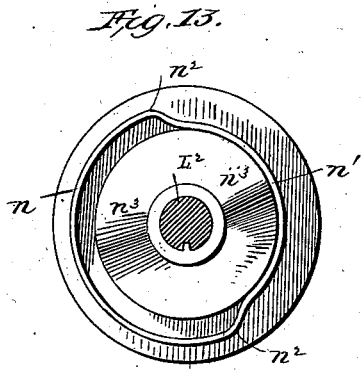
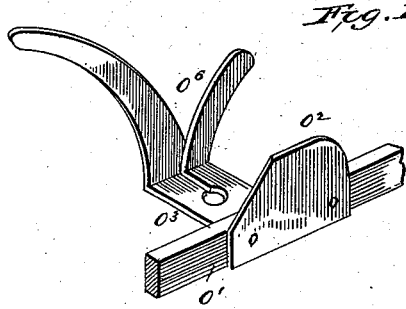
Witnesses,
Edwin T. Yewell,
W. F. Huntemann.
Inventor.
M. L. Nichols.
By his Attorney.
Alex Mahon.

(No Model.)

11 Sheets—Sheet 9.

M. L. NICHOLS.
GRAIN BINDER.

No. 381,079. Patented Apr. 10, 1888.

Witnesses
Edwin L. Yewell,
Wm. F. Huntemann.

Inventor
M. L. Nichols
By his Attorney
Alex. Mahon (No Model.)  11 Sheets—Sheet 10.

M. L. NICHOLS.
GRAIN BINDER.

No. 381,079. Patented Apr. 10, 1888.

Witnesses.
Edwin T. Jewett,
Wm. F. Huntemann.

Inventor.
M. L. Nichols.
By his Attorney
Alex Mahon.

(No Model.)　　　　　　　　　　　　　　　11 Sheets—Sheet 11.
M. L. NICHOLS.
GRAIN BINDER.
No. 381,079.　　　　　　　　　　Patented Apr. 10, 1888.
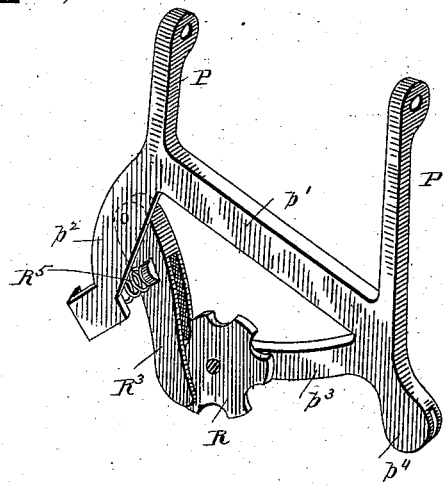
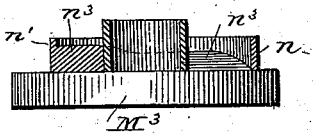
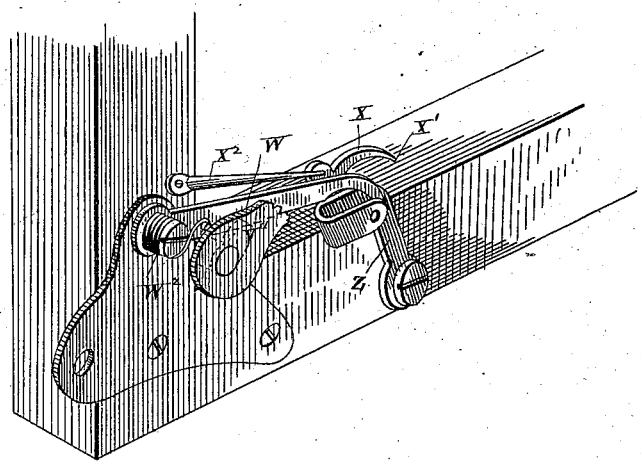
WITNESSES.　　　　　　　　　　　　　　　INVENTOR,

UNITED STATES PATENT OFFICE.

MARION L. NICHOLS, OF NEW YORK, N. Y., ASSIGNOR TO THE NICHOLS HARVESTER COMPANY, OF SAME PLACE.

GRAIN-BINDER.

SPECIFICATION forming part of Letters Patent No. 381,079, dated April 10, 1888.

Application filed January 11, 1887. Serial No. 224,024. (No model.)

*To all whom it may concern:*

Be it known that I, MARION L. NICHOLS, of the city, county, and State of New York, have invented certain new and useful Improvements in Grain-Binders, of which the following is a full and exact description, reference being had to the accompanying drawings, making a part of this specification.

My invention relates particularly to that class of grain-binders using cord as the binding material and with means for automatically controlling the action of the binding devices by the grain accumulated to form the bundle, and the mechanism is shown herein as applied to a machine in which the grain is delivered to the binding mechanism on a level with the carrier and known as "low-down binders," and the other parts which act upon the grain before being presented to the binding devices are made the subject of a separate application of even date herewith.

The invention consists in the combination of an automatic trip controlled by the grain accumulated to form the bundle with a separating device actuated by the trip to separate the incoming grain from that to form the bundle and hold it during the operation of binding.

It further consists in the combination of the separating mechanism with the binding mechanism, whereby the separating mechanism acts to trip the binding devices.

It further consists in the combination of the separator to trip the binding devices with means controlled by the driver to throw the separator into action at will.

It further consists in the combination of the automatically-operating trip with means to be controlled by the driver to regulate the size of the bundle at will.

It further consists in the combination of the horizontally-arranged carrier, a trip-arm located in the path of the grain, a separating-arm, and a binder-mechanism trip to be actuated by the separating-arm.

It further consists in the combination of the trip-arm for throwing the binding mechanism into action with an automatically-operating mechanism for throwing the devices into and out of action in turning the machine.

It further consists in the combination of the trip-arm with the needle to act upon the trip-arm to cause the same to act as a compress-arm.

It further consists in a novel construction of knotter, and also in means for operating the same.

It further consists in a novel manner of operating the gripper.

It further consists in a novel construction of combined cord guide and stripper and the means for operating the same.

It further consists in the combination of the cord guide and stripper with a knife operating in connection therewith.

It further consists in a novel manner of operating the cord guide and stripper and knife through the ejector-arm, and in certain novel features in the construction and arrangements of parts, all as hereinafter explained.

Figure 2:
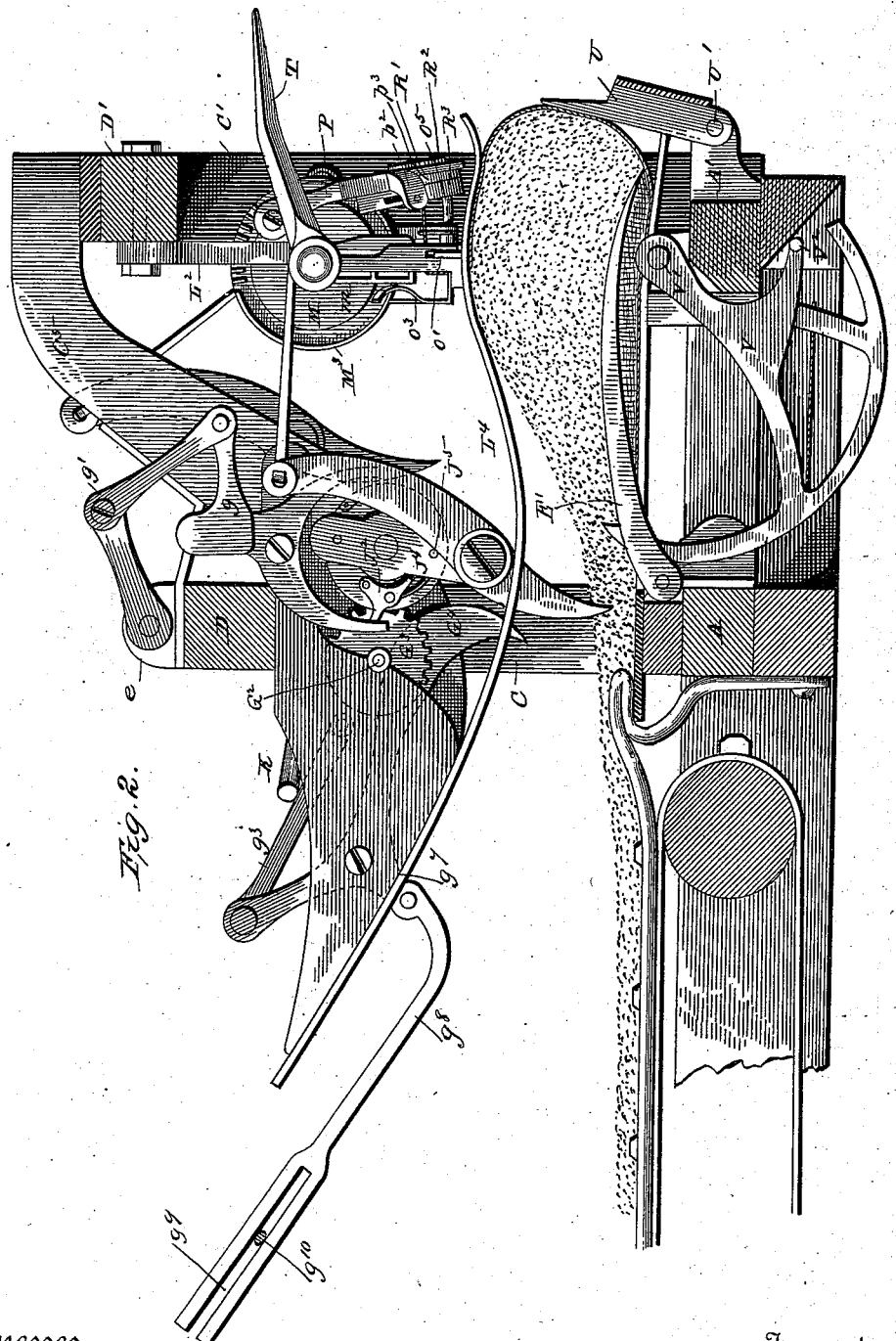
Figure 3:
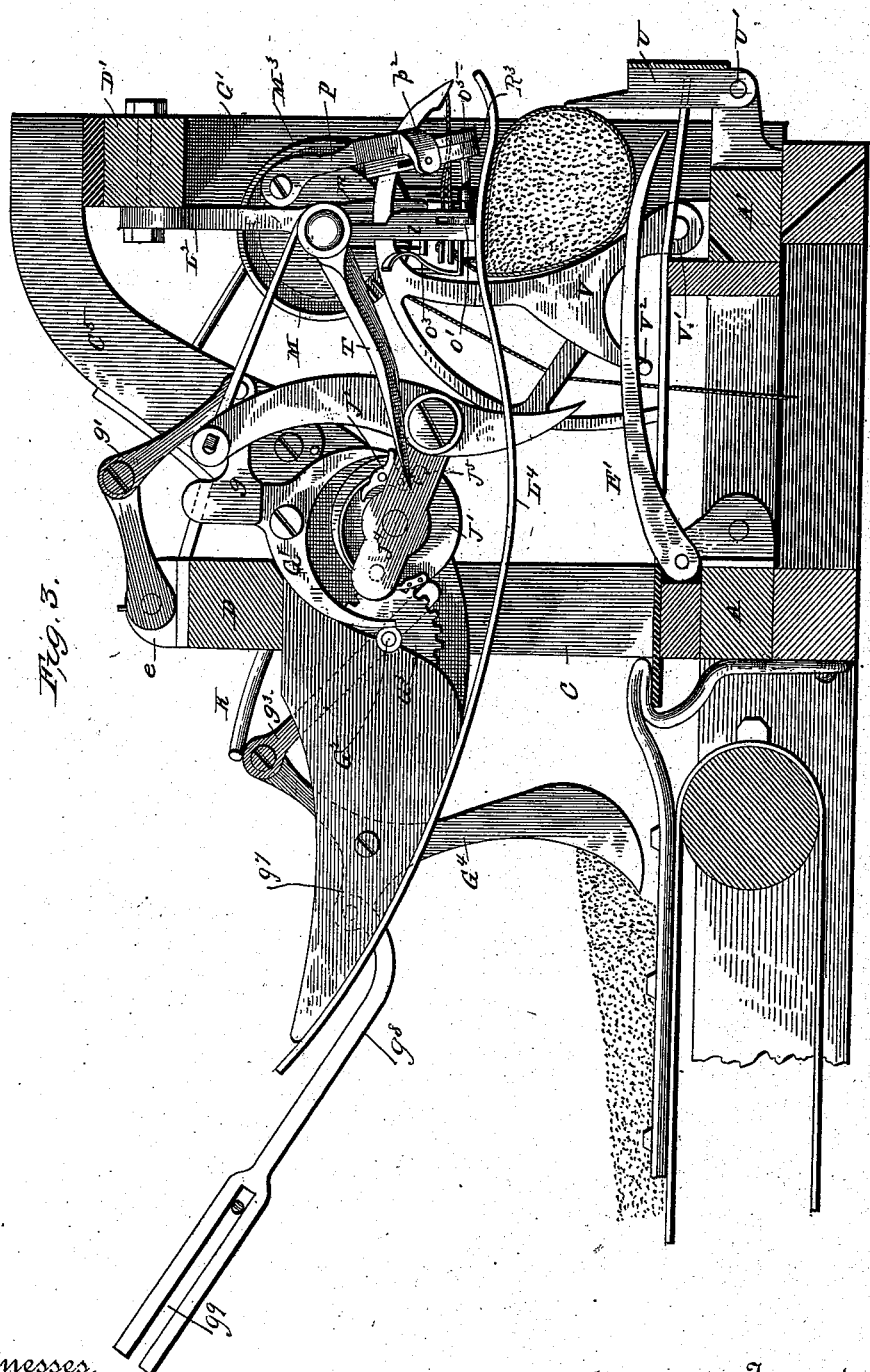
Figure 11:
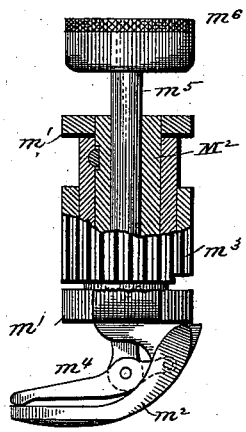
Figure 9:
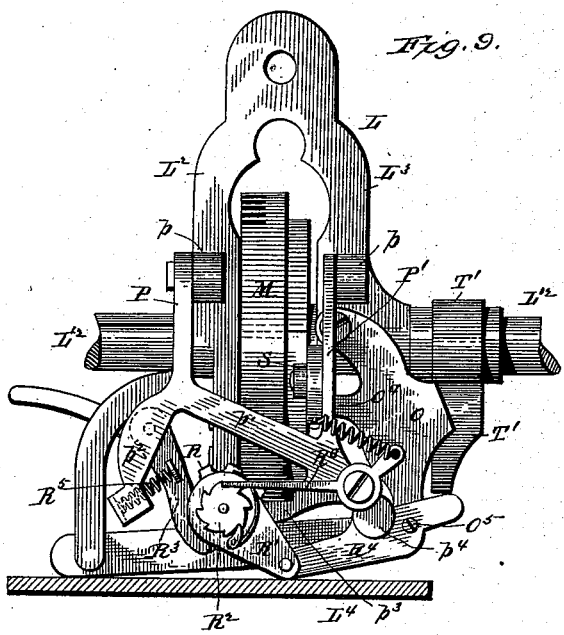
Figure 10:
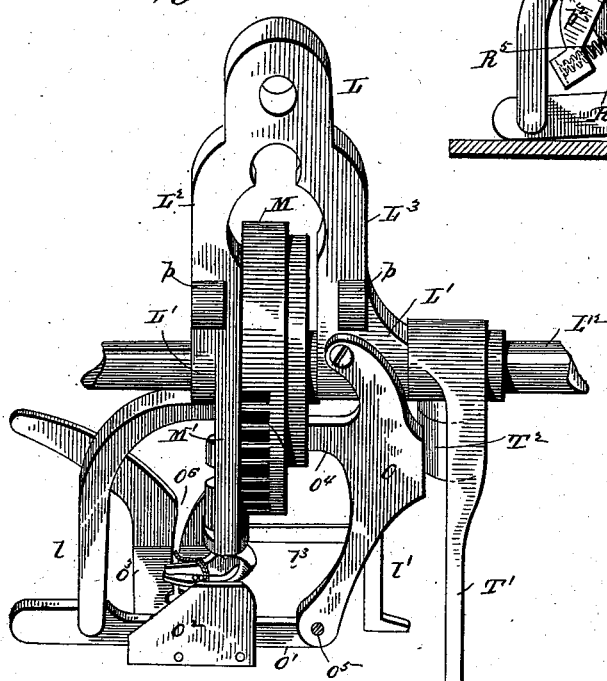

In the accompanying drawings, Figure 1 is a rear view of a harvester platform-binder, showing the relation of the binding devices to the carrier. Fig. 2 is a longitudinal section through the frame in front of the binding devices, showing the grain as being delivered thereto and before the devices are thrown into action. Fig. 3 is a similar view showing the devices thrown into action and after the bundle has been encompassed by the band. Fig. 4 is an enlarged rear view of the binder-frame detached from the machine, showing the gearing through which motion is communicated to the several parts. Fig. 5 is a skeleton perspective view of the separator-trip and binding-trip mechanism, showing the means for adjusting the trips. Fig. 6 is a side and face view of the shifting-trip-mechanism gear-wheel, and Fig. 7 similar views of the sprocket-wheel engaging the same. Fig. 8 is a top view of the rear end of the binding-frame. Fig. 9 is a face view of the knotting-mechanism frame, taken from the delivery side, showing the device for operating the knotter, cord guide and stripper and knife, and the gripper. Fig. 10 is a similar view of the gripper removed. Fig. 11 is a side view of the knotter, partly in section. Fig. 12 is a perspective view of the knotter and its actuating-wheel, also the cord guide and stripper and knife and the lever by which they are operated. Fig.

Figure 15:
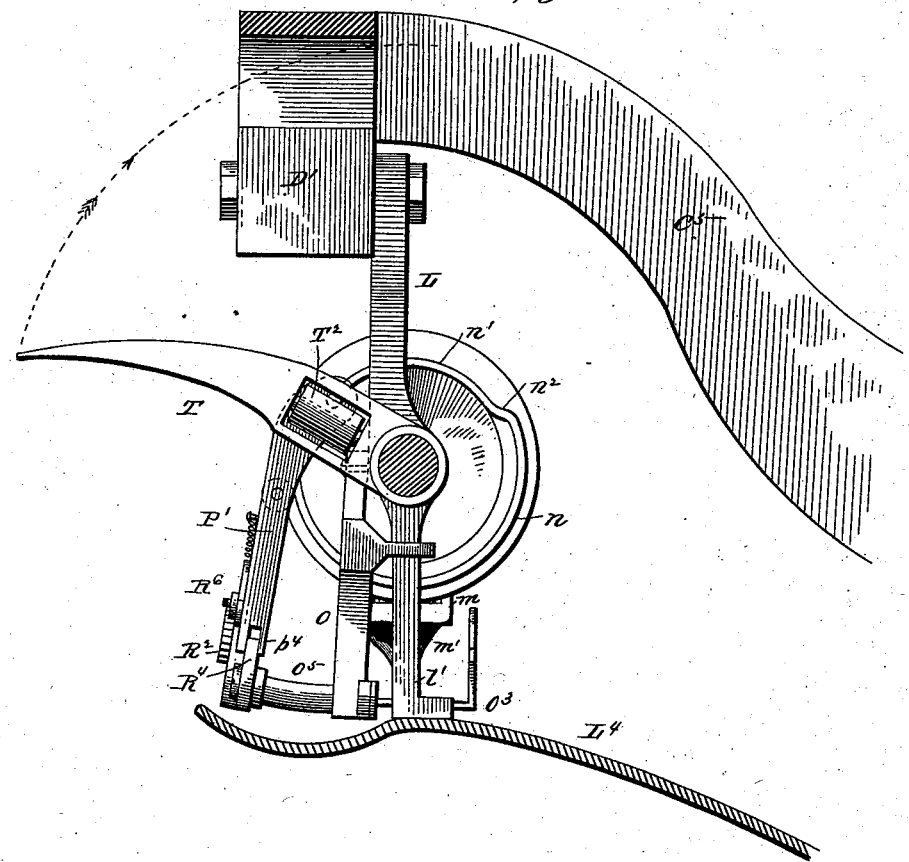
Figure 16:
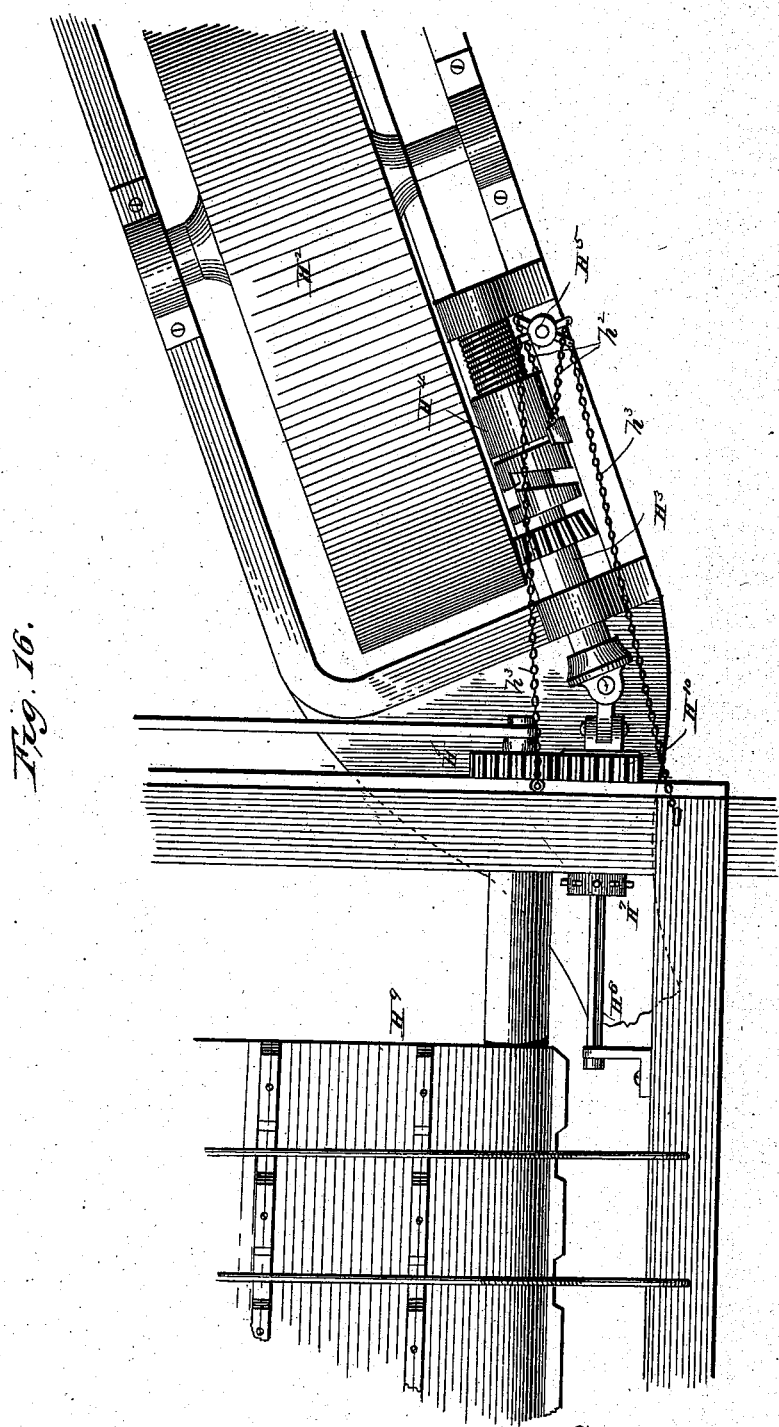

13 is a rear view of the cam and gear wheel. Fig. 14 is a perspective view of a portion of the cord guide and stripper and knife-bar, showing the relation of the parts to each other. Fig. 15 is a section of a portion of the knotting-mechanism supporting-frame on a line in rear of the knotter, showing the means whereby the gripper is swung to and from the knotter. Fig. 16 is a plan or top view of a portion of the rear of the main frame, showing a part of the master-wheel and the gearing for communicating motion from said wheel to the devices, and the means for connecting the wheel whereby the parts are automatically thrown out of action in turning the machine. Fig. 17 is a perspective view of the gripper-frame, showing the disk and shoe. Fig. 18 is a perspective view of a portion of the frame, showing the tension and take-up. Fig. 19 is a section through a portion of the knotting-mechanism gear and cam wheel.

The frame on which the binding devices are mounted consists of an oblong rectangular frame having the sill-bars A A', end bars, B B', upright posts C C', and the upper or cross bars, D D'. The frame thus constructed is mounted upon the projecting frame-bars adjacent to the carrier, as described in the application of even date herewith, and as shown in Fig. 1 of the drawings in this application, being mounted thereon in such a manner as to have an endwise movement to adjust the binding devices to different lengths of grain in a manner hereinafter explained.

In bearings $a\, a'$, one located centrally and the other at the rear end of the sill-bar A, is mounted a rock-shaft, E, having secured at its inner end a trip arm or finger, E', and at its other a crank-arm, $E^2$, which in turn is connected with a perpendicularly-arranged arm or lever, $E^3$, having its connected end slotted, as shown. The lever $E^3$ is shown mounted in a guideway, $E^4$, secured to a cross arm or brace, $C^4$, extending between the posts C C'. This arm $E^3$ is connected at its upper end through a link, $E^5$, with the arm of a rock-shaft, G, mounted in bearings $e\, e'$ upon the cross-bar D of the frame above and parallel with the rock-shaft E, and has also pivoted to it about midway of its length a pawl, $E^6$, which is in turn pivoted to the arm or brace $C^4$, with its free end bent, as shown, to engage a cam-face, H', formed upon the hub of the binder-mechanism gear-wheel H, which cam is formed by cutting away a portion of said hub and for a purpose hereinafter explained.

The pawl $E^6$ has connected to it a spiral spring, $e^6$, which at its upper end is connected with a screw-threaded shaft, $e^7$, mounted in a bearing, $e^8$, secured to the bar $C^4$, and having mounted thereon a thumb-nut or handle, $E^9$, by which the tension of the spring upon the pawl $E^6$ may be regulated, for the purpose hereinafter explained.

A shaft, I, is mounted at one end in bearings connected to the post C and at the other in an arm or support, $C^5$, extending between the upper cross-bars, D D', and parallel with the shafts E and G, being located about midway between the same. This shaft has keyed upon one end a sprocket-wheel, I', having an enlarged hub or disk formed therewith, and from the outer face of which disk project friction-sleeved lugs $I^2$, and adjacent to this wheel the shaft has loosely mounted upon it a pinion, $I^3$, also having a hub or disk formed thereon, and on which disk is pivoted a rocking spring-pawl, $I^4$, having arms $i\, i'\, i^2$, from one of which, $i^3$, projects a friction-sleeved lug hereinafter referred to. Upon the opposite end of this shaft is loosely mounted a pinion, J, having a disk or plate, J', secured thereto, carrying upon its outer face a rocking spring-pawl, $J^2$, formed in a similar manner to the pawl $I^4$. The shaft has formed in it upon one side of the frame $C^5$ a crank portion, to which is connected one of the packing-arms, the other being connected to the outer end of the shaft through an arm, $J^4$, rigidly connected centrally of its length to said shaft I. This arm $J^4$ carries upon each end upon the face adjacent to the disk friction-sleeved lugs $J^5$ to be engaged by the arm of the pawl $J^2$, carrying the sleeved lug, in a manner hereinafter explained.

Upon the frame $C^5$ is pivotally supported a bifurcated or forked arm, G', with its depending arms overhanging the pawl $J^2$, and provided with inwardly-projecting lugs $h\, h'$ to engage the pawl-arm.

The upper end of the arm G' is provided with an extended lug or ear, $g$, which is connected with a crank-arm extending from the rock-shaft G through a link, $g'$. A stud-shaft, $G^2$, has mounted upon it a pinion, $G^3$, to engage the pinion J, and the pinion $G^3$ has projecting from it a lug or ear, $g^2$, which is connected through a link or arm, $g^3$, with a pivoted separating-arm, $G^4$, mounted in a projecting portion of the arm or support $C^5$, overhanging the carrier. The separating-arm $G^4$ has extending from its front face an arm or lug, $g^7$, to which is connected a guiding and depressing arm, $g^8$, which curves from its point of connection with the separating-arm first downward and thence upward and forward above the carrier, and has its forward end forked or slotted, as shown at $g^9$, to engage a guide-rod, $g^{10}$, fixed to any suitable point on the frame of the machine. This guiding and depressing arm, being connected with the separating-arm, operates simultaneously therewith and in such manner that when the separating-arm is forced downward and outward toward the carrier to divide and hold the incoming grain from that accumulated to form the bundle the guiding-arm will be raised to afford space for the grain brought by the carrier against the separating-arm; but when the separating-arm is raised to permit the grain to pass to the binding-receptacle the guiding and depressing arm will act to press that upon the apron downward and backward and into position to be acted upon by the packers, the end of the guiding and depressing arm being held and controlled in its movement at its forward end by the guide-rod $g^{10}$.

A lever-arm, K, pivoted in bearings secured to the under side of the frame-bar D near the post C, extends out therefrom and rests upon the link $g^3$, and has its other end connected through an arm or link, K', to one arm of an angular frame, $K^2$, straddling the lever $E^3$ below the point of connection therewith of the pawl $E^6$, and having a pivotal connection, $K^4$, in the arm or brace $C^4$. The other or rear arm of this frame extends parallel with the front arm and is provided with a lug or projection, $K^5$, to engage the arm $i'$ of the rocking pawl $I^4$. The lever-arm K has connected to it between its pivotal point and its point of connection with the arm or link K' a spiral spring, $K^3$, which is in turn connected with the frame-bar D, serving to hold the lug on the frame $K^2$ in engagement with the arm $i'$ of the pawl $I^4$, and also its free end pressed down upon the link $g^3$ of the separating-arm.

On a stud-axle projecting from the inner face of the guideway $E^4$ is loosely mounted a pinion, $E^9$, in such position as to engage the pinion $I^3$ and the gear-wheel H, and through which motion is communicated from the sprocket-wheel to said gear-wheel H.

The trip-arm of the separator and binding mechanism, as above described, operates in the following manner: When the trip-arm E' is depressed, it rocks the shaft E, and by its connection through the arm or lever $E^3$ with the rock-shaft G rocks said shaft, causing it through its connections to oscillate the forked arm G', which releases the pawl $J^2$ from engagement with the lug $h$, when the stud-pinion of the pawl will be engaged by one of the sleeved lugs $J^5$ on the arm $J^4$ to clutch the pinion to the arm $J^4$, and consequently be revolved thereby. When the pinion has made a half-revolution, the pawl will be engaged by the lug $h'$, which has by the rocking of the forked arm to release the pawl on one side been brought into proper position to engage it on the other to throw the pawl out of engagement with the sleeved lug and unclutch the pinion from the arm. In the movement of the pinion J it communicates motion to the pinion $G^3$, which in its revolution, acting through its connecting-arm, forces the separating-arm outward to catch the incoming grain and divide it from that accumulated to form the bundle. As the pinion $G^3$ revolves, it raises the link $g^3$, which acts to raise the lever-arm K, overcoming the tension of the spring, and through the connection of the lever-arm K with the frame $K^2$ to rock said frame upon the pivot $K^4$, releasing the pawl $I^4$ on the pinion $I^3$ from engagement with the lug, and cause the sprocket-wheel to be clutched therewith through the sleeved lugs $J^2$ and stud-pin $i^3$ and communicate motion to the gear-wheel on the binder-shaft. Before the tripping mechanism is brought into action the nose of the pawl $E^6$ rests on the cut-away or narrowest portion of the cam H' on the hub of the gear-wheel H; but when the arm or lever $E^3$ is drawn down by the action of the rock-shaft E thereon and simultaneously with the rocking of the shaft G it also raises the pawl $E^6$ out of engagement with the cam H', and as the wheel is revolved through the sprocket-wheel I', pinion $I^3$, and intermediate pinion, $E^9$, the enlarged portion of the hub is caused to engage the pawl and hold it in the position to which it has been raised by the trip-arm and against the tension of the spring $e^6$, and also the arm or lever $E^3$ in the position to which it has been lowered. The slot in the end of the arm or lever $E^3$, when it is in this position and free from the tension of the spring, permits the arm connecting the trip-arm with the lever $E^3$ to have a free movement within the limits of the slot and allow a consequent movement of the trip-arm, for a purpose hereinafter explained. When the gear-wheel has made nearly a complete revolution and the pawl $E^6$ reaches the cut-away portion of the hub, it is forced into engagement therewith by the spring $e^6$, raising the arm $E^3$, which rocks the shaft G and through it swings the forked arm G', causing said forked arm to resume its normal position, which movement releases the pawl $J^2$ from engagement with the lug $h'$, and to be again engaged by the sleeved lug $J^5$ on the arm $J^4$ and complete the revolution of the pinion, which raises the separating-arm out of the way of the grain into its original position, which movement releases the arm K and by the action of the spring $K^3$ upon its opposite end causes it to raise the frame $K^2$ and bring the lug $K^5$ into position to engage the pawl $I^4$, throwing the pinion out of clutch with sprocket-wheel and bringing the wheel H to rest. The sprocket-wheel, being keyed to the shaft I, continues to revolve to operate the packing-arms, in a manner that will be readily understood.

The packing-arms, as before stated, are arranged upon each side of the arm or support $C^5$ and of the separating-arm $G^4$, and operate in such a manner that when the separating-arm has been thrown down to catch and force the incoming grain backward toward the carrier, and before the needle begins to act, the packers, continuing to revolve, will take any grain left upon the rear edge of the separating-arm and knotting mechanism and carry it to that accumulated to form the bundle, and thereby leave a clean space for the needle to work through, and consequently prevent any clogging or the carrying of any grain by the needle through the slot into the shield.

The knotter-mechanism frame L is supported at its top from the cross-bar D' and is provided with hubs or bearings L', through which the operating-shaft $L^{12}$ passes. The frame consists of the two arms $L^2$ $L^3$, having bent arms or supports $l$ $l'$, extending from the lower side of the hubs L', through which the end of the shield $L^4$ is connected therewith, the forward end of the shield being connected with the under face of the support $C^5$, and is provided with longitudinal slots to permit the movement of the separating-arms, packers, and needle-arm through the same. The space between the inner faces of the hubs L' is made of such width as to closely fit the hub of knotter-cam and gear-wheel M, and the wheel M is connected to the shaft $L^{12}$ by means of a feather or key engaging a longitudinal groove or key-seat formed in the shaft, which manner of connecting said wheel, while permitting it to be readily connected or disconnected from its shaft, firmly holds it in place and prevents it from wabbling or in any manner becoming disconnected from the parts it operates.

The hub of the arm $L^2$ has depending from it, cast or otherwise secured thereto, a knotter-supporting frame, M', having side arms, $m$, and connecting cross-arms $m'$, the cross-arms serving as bearings for the knotter-shaft, and the frame is braced by an arm, $l^3$, extending from the lower cross-arm to the support $i'$.

The knotter consists of a central sleeve, $M^2$, with which the fixed lower jaw, $m^2$, is formed, which sleeve fits and is adapted to turn in the bearings $m'$ $m'$. Upon this sleeve and keyed thereto is mounted a pinion, $m^3$, by which the knotter is revolved. The upper jaw, $m^4$, is pivoted at its heel end within the fixed jaw and extends out to the point thereof, and has connected to it between its point and pivot a rod, $m^5$, mounted and moving in the sleeve $M^2$. This shaft has mounted upon its upper end a head or disk, $m^6$, through which the rod is reciprocated in the sleeve to open and close the pivoted jaw by rocking it on its pivoted heel end.

The knotting-mechanism cam and gear wheel M is provided with an inwardly-projecting rim, $M^3$, and a series of teeth, $M^4$, extending therefrom and through the rim, and the hub is squared or cut away, as shown at $m^7$, and between the cut-away portion of the hub and teeth is formed a wedge-shaped cam, $m^8$, which teeth, hub, and cam operate to revolve and open and close the pivoted jaw in the following manner: As the wheel is revolved, the teeth $M^4$ engage the pinion to revolve the same, and after the pinion has made a part of its revolution the wedge-shaped cam $m^8$ moves beneath the head or disk $m^6$, causing said head to ride on the inclined free end of the cam, and consequently reciprocates the shaft and opens the jaw to receive the cord, the squared or cut-away portion of the hub permitting such movement. After the cord has passed between the jaws, the head or disk is released from the cam, and by the engagement of the solid or curved portion of the hub with the upper face of the disk the jaw is closed.

The cam or gear wheel M is provided on its rear side with a circular cam-track having a depressed portion, $n'$, formed on a circle of less diameter than the raised portion $n$, and connected by inclined portions $n^2$, and is also provided within the cam-track with cam-faces $n^3$, said cams operating in a manner hereinafter described.

Pivoted to the arm $L^3$ is a lever, O, having its lower end extending down to the upper face of the shield, and has connected to said lower end a bar, O', extending at right angles therefrom and having its outer end engaged by and moving in a slot formed in the lower end of the support $l$.

The lever O has an arm, $O^4$, projecting therefrom, with a friction-wheel at its outer end, which arm extends out and into engagement with the cam-face $n^2$, and by the action of the cam thereon swings the lever on its pivotal connection. Upon one side of the bar O' is rigidly secured the knife $O^2$, and upon the opposite side is secured the combined cord guide and stripper $O^3$. The combined cord guide and stripper is made in angle form and provided with a central slot, $O^6$, extending into and in line with the knotter, the two arms formed by slotting the same being curved outwardly therefrom to prevent the cord from being accidentally displaced.

The gripping devices and the arms and links by which the same are operated are mounted in a frame, P P', having a pivotal connection at its upper end in bearings $p$, formed in the frame L and projecting therefrom above and parallel with the bearings L'. The two arms of the gripper-frame are connected by a cross-rod, $p'$, and are provided with three depending arms, $p^2$ $p^3$ $p^4$, below the cross-rod $p'$. The central arm, $p^3$, forms a support for the gripper-disk R, pawl-arm R', and pawl and ratchet $R^2$; the side arm, $p^2$, a support for the gripper-shoe $R^3$, and the arm $p^4$ a guide for the link $R^4$, connecting the lever O with the pawl-arm R'. The gripper-shoe $R^3$ is pivoted to the arm $p^2$, and is held in proper relation with a yielding pressure over the gripper-disk by a spring, $R^5$, to permit the shoe to yield for the passage of knots or uneven surfaces in the cord. The link $R^4$, which intermittently operates the gripper-disk, is connected to the lever O through a curved guide-arm, $O^5$, rigidly fixed to the lever, which manner of connecting the same, while permitting the lever to be swung to reciprocate the bar O' and move the knife and cord guide and stripper, and also oscillate the pawl-arm R' to intermittently revolve the gripper, permits the frame P to be swung to and from the knotter, for a purpose hereinafter explained. A dog, $R^6$, is pivoted to the arm $p^4$ and has one end arranged to engage the teeth of the ratchet $R^2$ and its heel end connected through a spiral spring with the arm P'. A stud-pin, S, provided with a friction-wheel, extends from the frame $p$ in position to be engaged by the cam-track $n$ $n'$ $n^2$, and by its engagement with the portion $n$ causes the frame, with the parts mounted thereon, to be forced or swung bodily from the knotter, and the depressed portion $n'$ permitting it to be drawn toward the knotter by the action of the cord thereon during the operation of tying.

Upon each side of the knotting-mechanism frame upon the shaft $L^2$ are mounted the ejector-arms T T', with the hub of the arm T' abutting against the hub L', and which arm has mounted in it a friction-wheel, T², to engage the arm O, and by means of which the arm is swung inward toward the knotter to reciprocate the knife to sever the cord and move the cord-guide to strip the knot, and act simultaneously to eject the bundle, which action serves to draw the cord from between the jaws and tighten the knot.

The rear compressor-arm, H, is mounted upon a shaft, U', and is operated from a cam-track formed on the inner face of the wheel H' in the usual or in any other way preferred.

The needle V is mounted upon a shaft, V', supported in bearings secured to the frame, the needle being constructed in the usual manner, except that it is provided with a projecting lug, V², arranged thereon to engage the trip-arm, and after the same has been released, after throwing the separator and binding mechanism into action, as before described, and by its action thereon to force the arm up against the bundle and cause it to act as a compressor-arm, the slot formed in the end of the lever E³, before referred to, permitting it to have sufficient movement for this purpose. The needle-shaft is rocked by means of a pitman, V³, connected to the wrist-pin on the wheel H, before referred to, the pitman being connected to said shaft through a crank-arm, V⁴.

A tension and take-up arm, W, having a guiding-eye, W', formed in one end, is mounted on a stud-shaft, W², and in position to be engaged by a lug formed on the needle-shaft, said take-up arm being forced down by means of a coiled spring having one end connected with the stud-shaft and the other end with a pin projecting from the arm W. At the forward end of the arm W is mounted a rocking bell-crank arm, X, having its forward end, X', made to curve around the end of the arm W, and having its other arm connected to the frame above the stud-shaft W² through a rigid arm, X².

The arm in which the guiding-eyes are formed, through which the cord passes from the twine-box to the needle, is made in U form, with an eye in each end, with a depending arm projecting from one of its ends to connect it with the frame, the arrangement of the parts being such that the end of the tension and take-up arm shall lie between the ends of the U-shaped arm when in its position of rest, with the cord passing first through one eye, thence through the eye in the take-up arm W, and thence through the other eye to the needle. As the needle is moved up to take the cord to the gripper, the tension and take-up arm is acted upon and raised, drawing upon the cord, and the point of the rocking arm X will be thrown downward by its arm and caused to press upon and tighten the cord in a manner and for a purpose that will be readily understood.

The arm E³, through which the trip mechanism is actuated, has mounted upon its upper end a handle, E¹², within convenient reach of the driver, and by pressing upon which he is enabled to trip the separating-arm at will. This is sometimes very desirable and important. If from any cause the cord should break in binding a bundle, the driver can by this means throw the separator into action and hold the incoming grain until the needle has passed up and taken the cord to the gripper and returned to its normal position.

The supporting-frame of the binder, as before stated, is made adjustable in relation to the carrier and is adjusted in the following manner: A supporting-arm, Y, rigidly connected to the frame, projects back therefrom and has mounted at its end a swiveling handle, Y', which is connected to a bell-crank lever, Y², through a link, Y³, the other arm of the lever being connected through a link, Y⁴, to a spring-bolt, Y⁵, which holds the frame in its adjusted position. The handle Y is arranged within convenient reach of the driver's seat, and by turning said handle he is enabled to release the bolt and move the frame back and forth also by means of the handle. The master-wheel H² is supported in a frame which has a pivotal connection with the main frame and is provided with the usual toothed portion. A shaft, H³, has a loose pinion mounted thereon with a clutch-face formed in its hub to be engaged by a clutch-faced sleeve, H⁴, which sleeve has connected to it a shifting lever for throwing it into and out of engagement with the pinion. A post, H⁵, located upon the wheel-frame adjacent to the lever, has mounted upon it two independently-operating swiveling or oscillating levers, one arm of each of which is connected by a short chain, h², with the shifting lever, and the other arm of each being connected by a chain, h³, with the frame of the machine and at such a point on either side of the pivotal center on which the frame of the master-wheel swings or turns to act upon the lever to throw the clutch-sleeve out of engagement with the pinion-clutch during the latter part of the action of the wheel in turning the machine.

The shaft H³ is connected to a shaft, H⁶, mounted in bearings in the main frame, through a universal-joint connection, and said shaft has mounted upon it a sprocket-wheel, H⁷, through which motion is communicated to the sprocket-wheel I', before referred to. A gear-wheel, H¹⁰, mounted on the shaft H⁶, meshes with a pinion, H⁸, on the shaft of the apron or carrier H⁹, and the pinion H⁸ has extending from it a wrist-pin for driving the cutters.

The driver's seat is connected to the wheel-frame through a support curving over the wheel, and the seat is mounted on said support over the wheel and about in line with the axle thereof.

The operation and time and movement of the several parts, briefly stated, are as follows: The grain, being brought in by the carrier to within reach of the packing-arms, is taken thereby and forced upon and over the trip-arm E' against the rear compressor. When sufficient grain has accumulated to form a bundle, the size being predetermined in accordance with the condition of the grain, the tension on the trip being set in accordance therewith, the trip-arm is pressed down, and, acting through the rock-shafts, as before described, throws the separating-arm downward to divide the incoming grain from that accumulated to form the bundle. After the separating-arm has been thrown entirely down, and before the needle commences its movement, the packing-arms, continuing to act, pick up any grain left in rear of the separating-arm and carry it to that accumulated to form the bundle. The needle then commences its upward movement to carry the cord around the bundle and into the gripper. At this time the cam $n^3$, acting on the arm $O^4$ of the lever O, swings said lever backward, moving the knife out of the way of the cord and carrying the cord guide and stripper back, forcing the cord close up to the shank of the knotter, and through the link $R^4$ and the pawl-arm R' revolves the gripper-wheel the distance of one notch to grip the cord brought forward by the needle. The knotter now commences its revolution to wrap the cord around the same. At this point the depressed portion of the cam-track is brought opposite the friction-wheel S, projecting from the arm $p'$ of the frame, and as the knotter draws upon the cord the frame swings inward, moving on the curved arm $O^5$, and is drawn close up to the knotter, giving the knotter sufficient cord to form the loop. After the cord has been looped around the knotter, the wedge-shaped cam $m^8$ moves beneath the head or disk $m^6$ to open and the solid curved portion of the hub to engage the upper side to close the pivoted jaw, as before described. The ejector-arms at this point, acting on the bundle to eject the same, have reached the point at which the friction-wheel $T^2$ on the arm T' begins to act on the lever O to force the knife forward to sever the cord, and the combined guide and stripper to strip the knot, at the same time to swing the link $R^4$ and the pawl-arm R' to permit the pawl to engage the next tooth to revolve the gripper at the next operation. As the needle recedes the enlarged portion $n$ of the track engages the friction-wheel S and forces the gripper-frame back to its normal position, by which action sufficient cord is drawn from the twine-box to provide sufficient slack for the next bundle, for the purpose before stated.

Parts of the machine not herein particularly described may be constructed in any usual or preferred way, and the binding mechanism may be mounted upon and used with a harvester which presents the grain thereto in a different manner than that described.

The matter herein described relating to the single arm or lever for operating the cord guide, gripper, stripper, and knife is made the subject of a separate application.

Having now described my invention, I claim—

1. The combination of a separator-arm for dividing the grain, mounted so as to oscillate a trip-arm, and mechanism, substantially as described, for connecting said arms, as set forth, whereby the trip is caused to automatically and positively control the movements of the separator by the grain accumulated to form the bundle and cause it to hold the incoming grain during the binding operation.

2. The combination of the carrier, a binding mechanism, packers, and a separating-arm operating in a reverse direction to the packers, and a trip mechanism for controlling the separating-arm, substantially as described, whereby the separating-arm is caused to act upon the incoming grain upon the carrier and force it back and out of the way of the packers, as and for the purpose set forth.

3. An automatic trip for grain-binders acted upon and controlled by the separating-arm, in combination with means to be controlled by the driver in his seat on the machine for operating the trip at will, substantially as described.

4. The combination of an automatically-operated separator and an automatically-operated trip, with means to be controlled by the driver for throwing the same into action at will, substantially as described.

5. An automatic trip for grain-binders acted upon and controlled positively by the separating-arm, substantially as described, whereby the grain to form the bundle is separated from the incoming grain before the binding devices are brought into action, as and for the purpose set forth.

6. The combination of the horizontally-arranged carrier, a trip-arm located in the path of the grain, a separating-arm actuated by the trip-arm, and a binder-mechanism trip actuated by the separating-arm, substantially as and for the purpose set forth.

7. The combination, with the intermittently-rotating pinion for imparting motion to the separator, of the bifurcated pivoted rocking arm operated by the trip-arm to rock said arm and cause it to alternately disengage and engage the clutch of the pinion to throw the same into and out of action, substantially as and for the purpose set forth.

8. The combination of the fixed jaw, the pivoted jaw, the rod or shaft provided with the disk or head, and a revolving drive-wheel provided with cams to engage the head to reciprocate the shaft and positively open and close the jaw, substantially as described.

9. The combination of the swinging frame carrying the gripper, the reciprocating combined cord guide and stripper, a knife, the arm or lever for reciprocating the cord guide, stripper, and knife, an arm connected with the knife-arm and forming a guide for and connection between the gripper-frame, cord guide, stripper, and knife, and a revolving drive-wheel provided with cams for reciprocating the cord guide, stripper, and knife, intermittently operating the gripper, and swinging the gripper-frame from the knotter, substantially as and for the purpose set forth.

10. The combination of the revoluble knotter-shaft, the combined cord guide and stripper, a knife having a fixed relation to the cord guide and stripper, the cam and rack wheel for revolving the knotter and moving the knife and guide in one direction, and the revolving ejector-arm for reciprocating the cord guide and knife in the opposite direction to sever the cord and strip the knot from the knotter, substantially as and for the purpose set forth.

11. The combination of the reciprocating knife, the gripper, and means, substantially as described, for connecting said gripper and knife, as set forth, whereby the knife is reciprocated and the gripper-frame swung bodily from the knotter and intermittently rotated by the knife-reciprocating mechanism.

12. The combination of the cord guide and stripper, a knife, a cord-gripper, and an arm or lever for operating the same, substantially as described, whereby the cord guide and stripper is reciprocated and the gripper swung to and from the knotter and intermittently revolved, for the purposes set forth.

13. The reciprocating cord guide and stripper, in combination with an ejector-arm acting on the stripper to cause the same to strip the knot simultaneously with its action in ejecting the bundle, as and for the purpose set forth.

14. The combination of the cord guide and stripper, a knife, and an arm or lever for operating said parts, having a swinging movement imparted thereto by the revolving gear and cam wheel and the revolving ejector-arm, substantially as described.

15. The slotted frame for carrying the tying devices, provided with bearings for the driving-shaft upon each side of the cam and gear wheel, in combination with the driving-shaft provided with the key seat or slot to engage the feather in the gear-wheel, substantially as and for the purpose set forth.

16. The combination of the guiding and depressing arm with the separating-arm, operating and timed in their movements substantially as and for the purpose set forth.

17. The combination of the tension and take-up arm, the rocking arm pivoted to the end of the take-up arm and connected to the frame by a link operating substantially as described, and the needle-shaft provided with the cam or projection to engage the arm of the take-up and operate the same, and through it the rocking arm, as and for the purpose set forth.

MARION L. NICHOLS.

Witnesses:
ALEX. MAHON,
EDWIN L. YEWELL.